US012785910B2

(12) United States Patent
Xiong et al.

(10) Patent No.: US 12,785,910 B2
(45) Date of Patent: Nov. 3, 2026

(54) METHOD AND DEVICE FOR SIGNAL TRANSMISSION IN WIRELESS COMMUNICATION SYSTEM

(71) Applicant: Samsung Electronics Co., Ltd., Suwon-si (KR)

(72) Inventors: Qi Xiong, Beijing (CN); Feifei Sun, Beijing (CN); Sa Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 18/283,161

(22) PCT Filed: Apr. 1, 2022

(86) PCT No.: PCT/KR2022/004699

§ 371 (c)(1), (2) Date: Sep. 20, 2023

(87) PCT Pub. No.: WO2022/211572

PCT Pub. Date: Oct. 6, 2022

(65) Prior Publication Data

US 2024/0163067 A1 May 16, 2024

(30) Foreign Application Priority Data

Apr. 1, 2021 (CN) ......................... 202110358433.4
May 19, 2021 (CN) ......................... 202110548045.2
Aug. 25, 2021 (CN) ......................... 202110981742.7

(51) Int. Cl.
*H04L 5/00* (2006.01)

(52) U.S. Cl.
CPC ................................ *H04L 5/0094* (2013.01)

(58) Field of Classification Search
CPC ....... H04L 1/0041; H04L 1/0067; H04L 1/18; H04L 5/0053; H04L 5/0062; H04L 5/0094; H04W 52/146; H04W 52/367
See application file for complete search history.

(56) References Cited

U.S. PATENT DOCUMENTS

2018/0124815 A1 5/2018 Papasakellariou
2019/0150143 A1* 5/2019 Yin ...................... H04L 5/0048 370/329

(Continued)

FOREIGN PATENT DOCUMENTS

CN 109802819 A 5/2019
CN 109923824 A 6/2019

(Continued)

OTHER PUBLICATIONS

Intel Corporation, Discussion on TB processing over multi-slot PUSCH, R1-2100666, 3GPP TSG-RAN WG1 Meeting #104-e, Jan. 19, 2021.

(Continued)

*Primary Examiner* — Awet Haile
(74) *Attorney, Agent, or Firm* — Jefferson IP Law, LLP

(57) ABSTRACT

The disclosure relates to a 5G or 6G communication system for supporting a higher data transmission rate. The application provides a method BS performed by a user equipment in a wireless communication system, comprising: performing a first operation when a transport block over multi-slot physical uplink shared channel TBoMS PUSCH overlaps with a first uplink signal; and transmitting TBoMS PUSCH signal and/or the first uplink signal.

8 Claims, 13 Drawing Sheets

(56) References Cited

U.S. PATENT DOCUMENTS

| | | | | |
|---|---|---|---|---|
| 2019/0215823 | A1 | 7/2019 | Kim et al. | |
| 2019/0230683 | A1 | 7/2019 | Akkarakaran et al. | |
| 2020/0367265 | A1 | 11/2020 | Wang et al. | |
| 2020/0404651 | A1 | 12/2020 | Takeda et al. | |
| 2022/0225388 | A1* | 7/2022 | You | H04L 1/08 |
| 2023/0379915 | A1* | 11/2023 | Dai | H04L 1/08 |
| 2023/0421318 | A1* | 12/2023 | Li | H04L 1/08 |
| 2024/0163011 | A1* | 5/2024 | Hasegawa | H04L 1/0071 |
| 2024/0179688 | A1* | 5/2024 | Echigo | H04W 72/0446 |
| 2024/0179692 | A1* | 5/2024 | Xiong | H04W 72/0446 |

FOREIGN PATENT DOCUMENTS

| | | | |
|---|---|---|---|
| CN | 111602365 | A | 8/2020 |
| EP | 4 404 664 | A1 | 7/2024 |
| WO | 2020/168034 | A1 | 8/2020 |

OTHER PUBLICATIONS

VIVO, Discussion on PUSCH TB processing over multiple slots, R1-2100458, 3GPP TSG-RAN WG1 Meeting #104-e, Jan. 18, 2021.

Huawei et al., Discussion on TB processing over multi-slot Pusch, R1-2100232, 3GPP TSG-RAN WG1 Meeting #104-e, Jan. 19, 2021.

Wilus Inc., Discussion on TB processing over multi-slot PUSCH, R1-2101680, 3GPP TSG-RAN WG1 Meeting #104-e, Jan. 19, 2021.

Samsung, TB processing over multi-slot PUSCH, R1-2101222, 3GPP TSG RAN WG1 #104-e, Jan. 19, 2021.

Ericsson, TB Processing over Multi-Slot PUSCH, R1-2105653, 3GPP TSG-RAN WG1 #105-e, May 12, 2021.

Lenovo et al., Enhancements for TB processing over multislot PUSCH, R1-2107191, 3GPP TSG RAN WG1 #106-e, Aug. 7, 2021.

European Search Report dated Jan. 20, 2025, issued in European Application No. 22781691.5.

Chinese Office Action dated May 29, 2026, issued in Chinese Application No. 202110981742.7.

* cited by examiner

METHOD AND DEVICE FOR SIGNAL TRANSMISSION IN WIRELESS COMMUNICATION SYSTEM

TECHNICAL FIELD

The invention relates to a method and equipment for signal transmission in a wireless communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

An aspect of the disclosure is to provide a method of providing a signal transmission between a terminal and a terminal in a telecommunication system.

Solution to Problem

In order to solve problems such as described above, certain embodiments according to this disclosure propose a method by a performed by a terminal in a wireless communication system, the method comprising: performing a first operation in case that a transport block over multi-slot physical uplink shared channel (TBoMS PUSCH) overlaps with a first uplink signal; and transmitting the TBoMS PUSCH signal or the first uplink signal.

Meanwhile, according to various embodiments of the disclosure, a method performed by a user equipment in a wireless communication system, comprising: performing a second operation under the condition that a transport block over multi-slot physical uplink shared channel TBoMS PUSCH transmission is supported; transmitting the TBoMS PUSCH, wherein the second operation includes a rate matching RM operation and/or a bit interleaving operation.

Meanwhile, according to various embodiments of the disclosure, a terminal in a wireless communication system, the terminal comprising: a transceiver; and at least one processor is configured to: perform a first operation in case that a transport block over multi-slot physical uplink shared channel (TBoMS PUSCH) overlaps with a first uplink signal, and control the transceiver to transmit the TBoMS PUSCH signal or the first uplink signal.

Advantageous Effects of Invention

An embodiment of the disclosure may provide a method of providing an efficient signal transmission between a terminal and a base station in an wireless communication system.

Effects obtainable from the disclosure may not be limited to the above mentioned effects, and other effects which are not mentioned may be clearly understood, through the following descriptions, by those skilled in the art of the disclosure.

MODE FOR THE INVENTION

Figure 1:
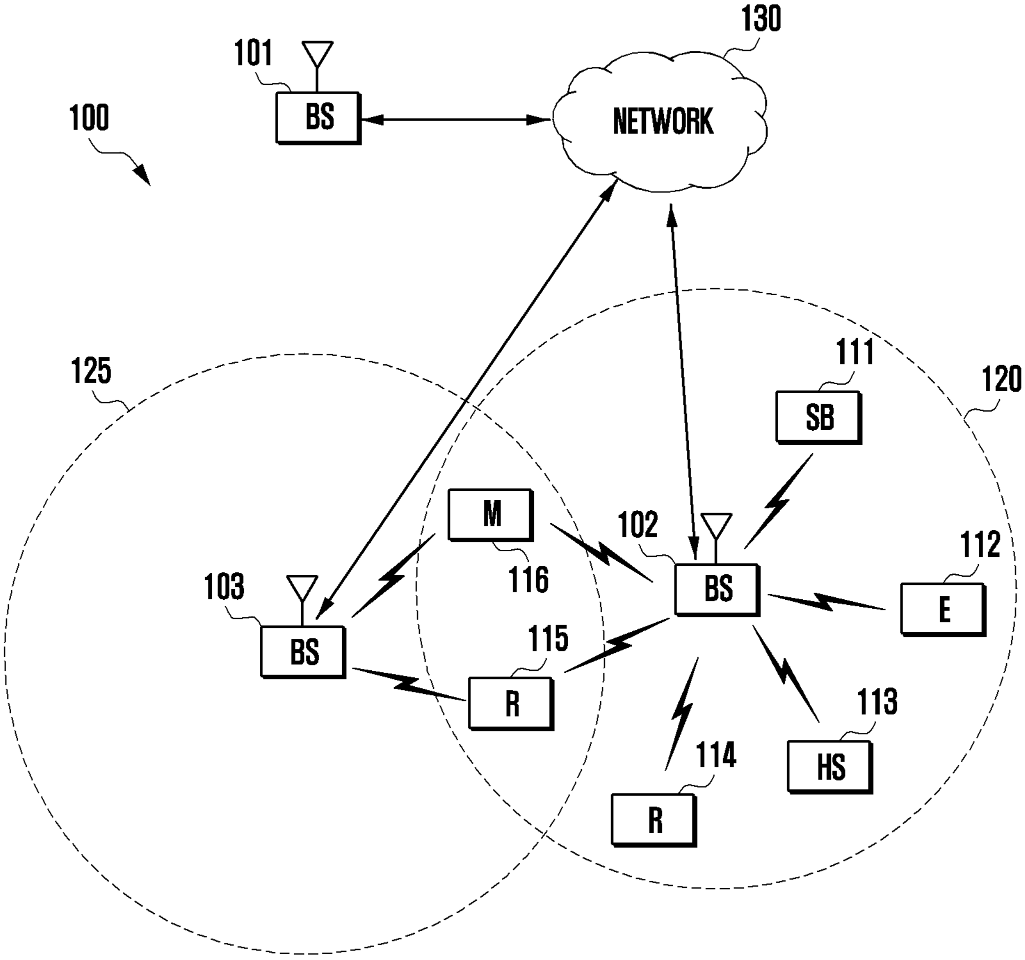
FIG. 1 shows a schematic diagram of an example wireless network 100 according to various embodiments of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alernative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards, the latest existing communication standards, for the convenience of description. However, the disclosure is not limited by these terms and names, and may be applied in the same way to systems that conform other standards. In particular, the disclosure may be applied to the 3GPP new radio (NR: 5G mobile communication standards) system. In order to make the purpose, technical scheme and advantages of this application more clear, this application will be further explained in detail with reference to the attached drawings and embodiments.

FIG. 1 shows an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
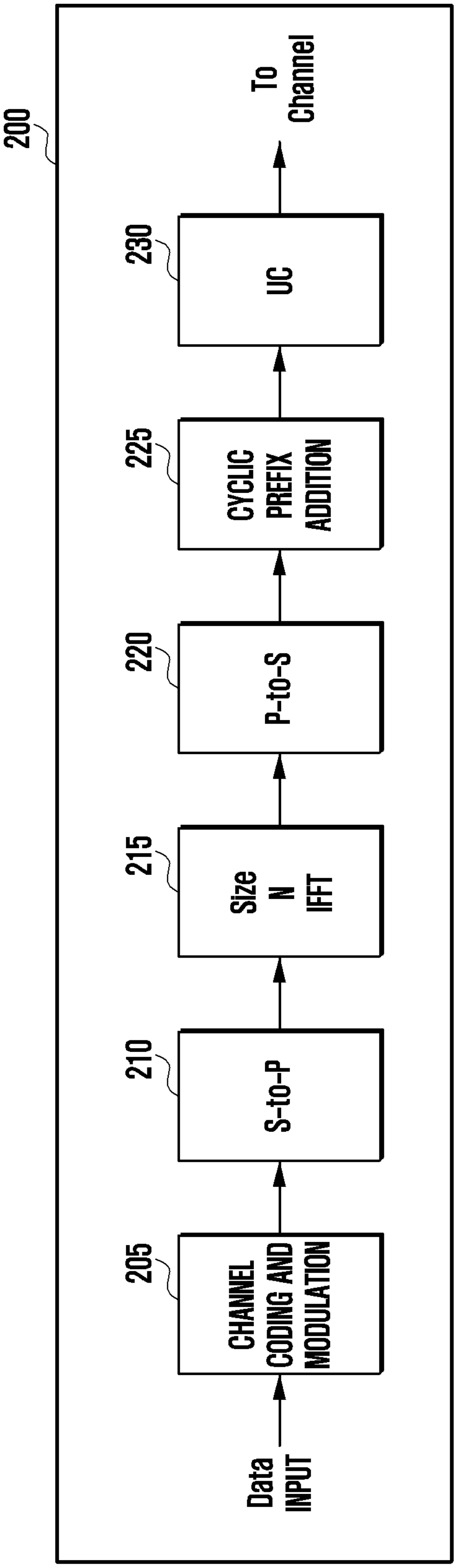
FIG. 2*a* shows a schematic diagram of example wireless transmission path according to the present disclosure.
Figure 2B:
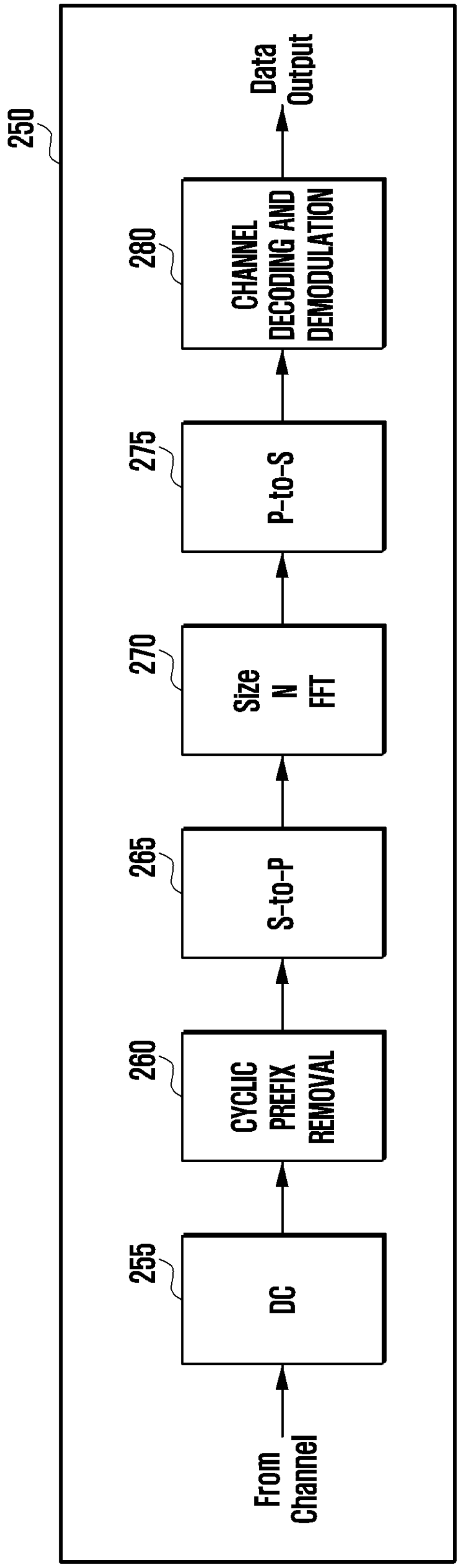
FIG. 2*b* shows a schematic diagram of example wireless transmission and reception paths according to the present disclosure.

FIGS. 2*a* and 2*b* illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and reception paths that can be used in a wireless network. Any other suitable architecture can be used to support wireless communication in a wireless network.

Figure 3A:
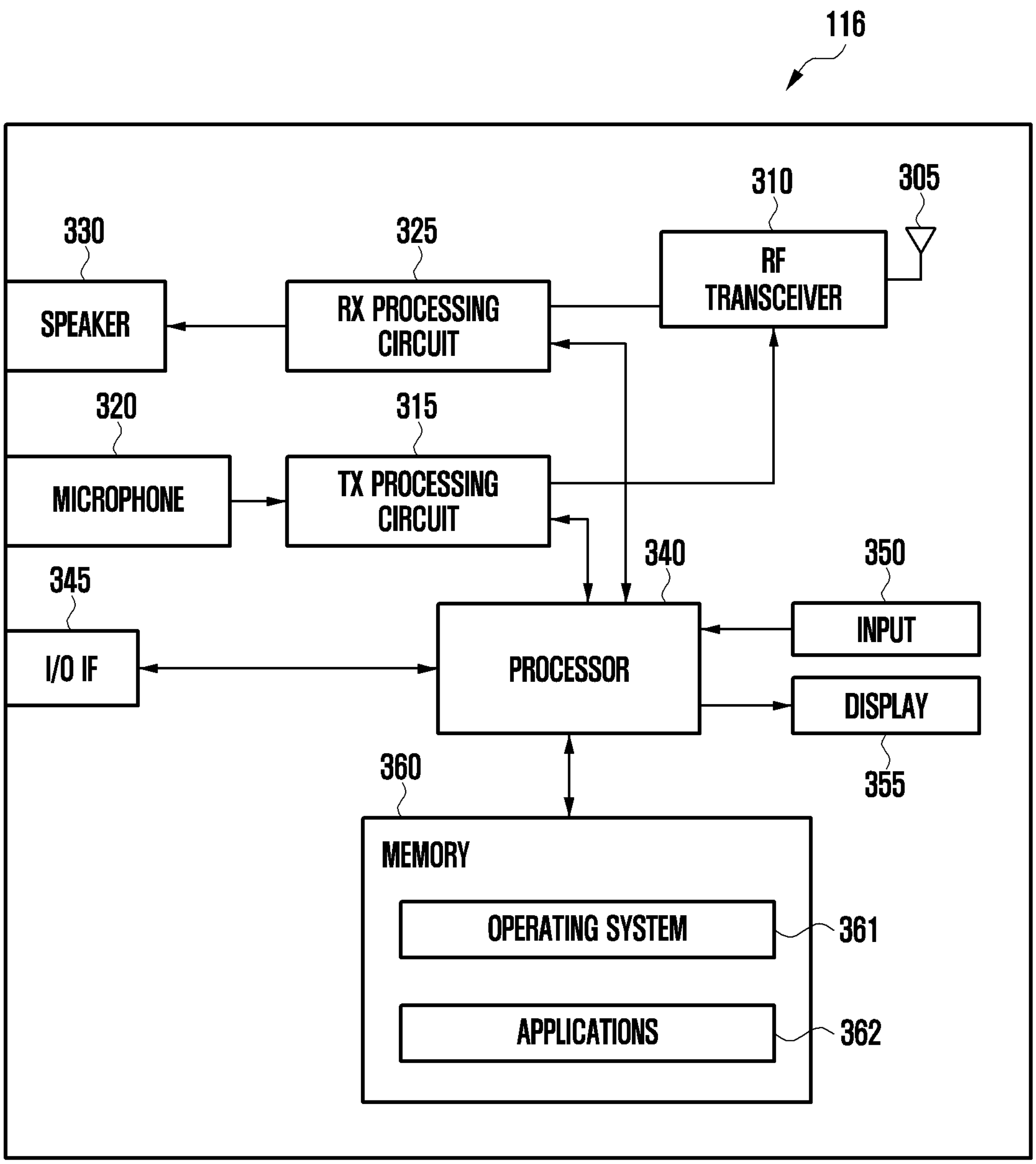
FIG. 3*a* shows a schematic diagram of an example UE 116 according to the present disclosure.

FIG. 3*a* illustrates an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3*a* does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of performing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, UEs can be configured to operate as other types of mobile or fixed devices.

Figure 3B:
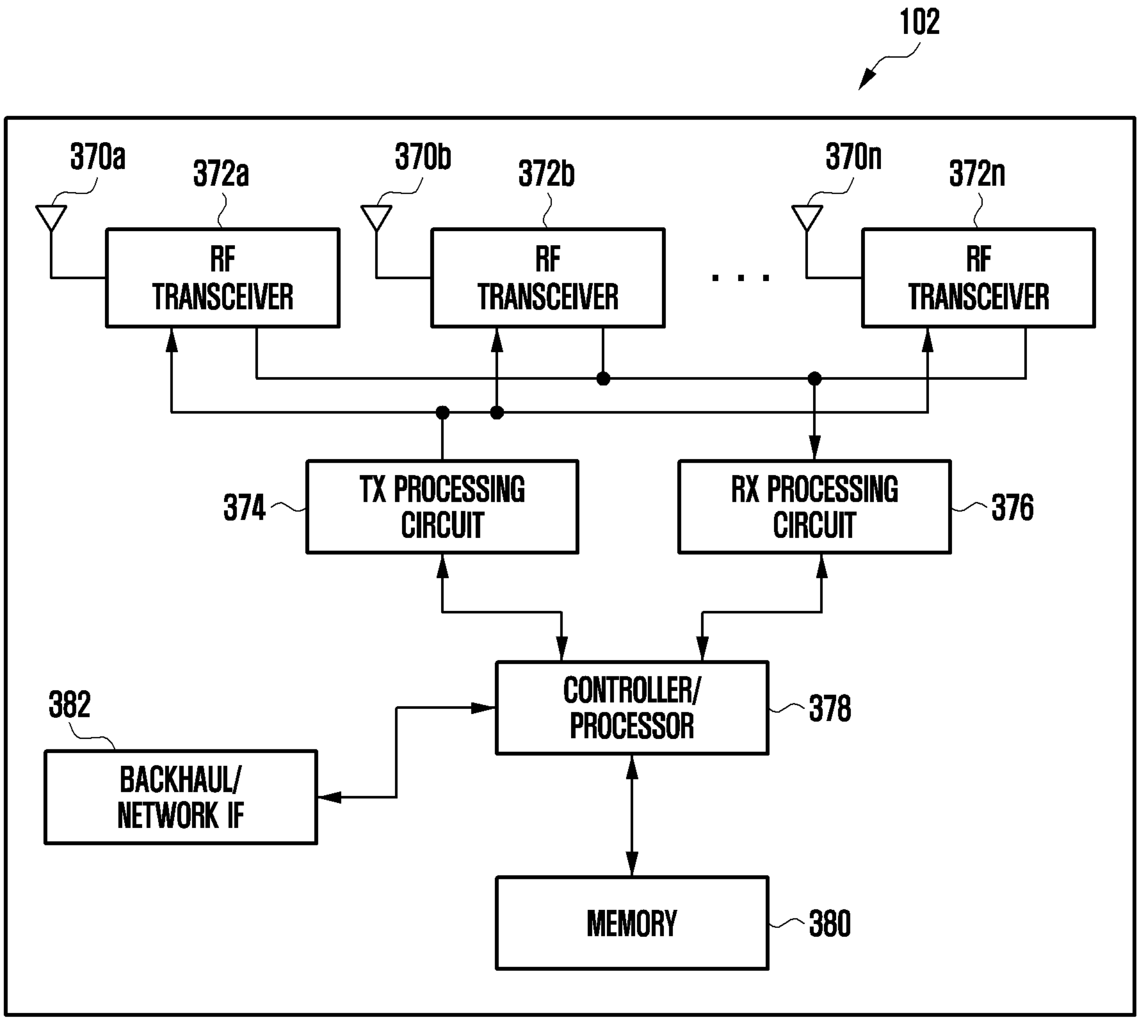
FIG. 3*b* shows a schematic diagram of an example gNB 102 according to the present disclosure.

FIG. 3*b* illustrates an example gNB 102 according to the present disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that gNB 101 and gNB 103 can include the same or similar structures as gNB 102.

As shown in FIG. 3*b*, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of performing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Exemplary embodiments of the present disclosure are further described below with reference to the accompanying drawings.

Those skilled in the art can understand that the singular forms "a", "an", and "the" used here can also include plural forms unless specifically stated. It should be further understood that the word "comprising" used in the specification of this application means the presence of said features, integers, steps, operations, elements and/or components, but does not exclude the presence or addition of one or more other features, integers, steps, operations, elements, components and/or groups thereof. It should be understood that when an element is described as "connected" or "coupled" to another element, it may be directly connected or coupled to other elements, or there may be intervening elements. In addition, as used herein, the statements "connected" or "coupled" may include wireless connection or wireless coupling. As used herein, the phrase "and/or" includes all or any unit and all combinations of one or more associated listed items.

Those skilled in the art can understand that unless otherwise defined, all terms (including technical terms and scientific terms) used here have the same meaning as those commonly understood by ordinary technicians in the field to which this application belongs. It should also be understood that terms such as those defined in the general dictionary should be understood to have meanings consistent with those in the context of the prior art, and will not be interpreted with idealized or overly formal meanings unless specifically defined as here.

It can be understood by those skilled in the art that "terminal" and "terminal equipment" used here include not only the equipment including wireless signal receiver which is a wireless signal receiving equipment without capability of transmitting signals, but also the equipment including receiving and transmitting hardware which is capable of bidirectional communication on bidirectional communication link. Such devices may include: cellular or other communication devices with single-line display or multi-line display or cellular or other communication devices without multi-line display; PCs (Personal Communications Service), which can combine voice, data processing, fax and/or data communication capabilities; PDA(Personal Digital Assistant), which may include radio frequency receiver, pager, internet/intranet access, web browser, notepad, calendar and/or GPS(Global Positioning System) receiver; conventional laptops and/or palmtop computers or other devices having and/or including a radio frequency receiver. As used herein, "terminal" and "terminal equipment" can be portable, transportable, installed in the (aviation, maritime and/or land) transport, or suitable and/or configured to operate locally, and/or operate in any other place on the earth and/or space in a distributed manner. As used herein, "terminal" and "terminal equipment" can also be a communication terminal, an Internet terminal and a music/video playing terminal, such as PDA, MID (Mobile Internet Device) and/or a mobile phone with music/video playing functions, a smart TV, a set-top box and other devices.

The time domain unit (also called time unit) in this invention can be: an OFDM symbol, an OFDM symbol group (composed of multiple OFDM symbols), a time slot, a time slot group (composed of multiple time slots), a subframe, a subframe group (composed of multiple subframes), a system frame and a system frame group (composed of multiple system frames). And it can also be an absolute time unit, such as 1 millisecond, 1 second, etc. The time unit can also be a combination of various granularities, such as N1 time slots plus N2 OFDM symbols.

The frequency domain unit in this invention can be: a subcarrier, a subcarrier group (composed of multiple subcarriers), a resource block (RB), which can also be called a physical resource block (PRB), a resource block group (composed of multiple RBs), a band part (BWP), a band part group (composed of multiple BWPs), a band/carrier, a band group/carrier group. And it can also be an absolute frequency domain unit, such as 1 Hz, 1 kHz, etc. The frequency domain unit can also be a combination of various granularities, such as M1 PRBs plus M2 subcarriers.

And the text and drawings are provided as examples only to help readers understand the present disclosure. They are not intended and should not be interpreted as limiting the scope of the present disclosure in any way. Although some embodiments and examples have been provided, based on the disclosure herein, it is obvious to those skilled in the art that changes can be made to the illustrated embodiments and examples without departing from the scope of this disclosure.

Transmission in the wireless communication system includes: transmission from the base station (gNB) to the User Equipment (UE) (called downlink transmission) (and corresponding time slot is called downlink time slot), and transmission from UE to the base station (called uplink transmission) (and corresponding time slot is called uplink time slot).

In the downlink communication of wireless communication system, the system periodically transmits synchronization signals and broadcast channels to users through synchronization signal block (SSB), and the periodicity is called SSB periodicity or SSB burst periodicity. At the same time, the base station will configure a physical random access channel configuration period (PRACH configuration period), in which a certain number of random access transmission occasions (also called random access occasions, PRACH transmission occasion (RO)) are configured, and all SSBs in an association period (a certain length of time) can be mapped to the corresponding ROs. In a mapping cycle from SSB to RO, all SSBs in one SSB periodicity can be mapped to the required random access resources. There can be one or more mapping cycles in one association period. An association pattern period from SSB to RO contains one or more association periods, and the mapping pattern from SSB to RO in each association pattern period is the same.

In the New Radio (NR) communication system, before the establishment of radio resource control, such as in the random access procedure, the performance of random access directly affects the user experience. In traditional wireless communication systems, such as LTE and LTE-Advanced, the random access procedure is used in many scenarios, such as establishing initial link, cell handover, re-establishing uplink, RRC connection re-establishment, etc., and it is divided into Contention-based Random Access and Contention-free Random Access according to whether users monopolize preamble resources. In the Contention-based Random Access, each user chooses a preamble sequence from the same preamble sequence resources in the process of trying to establish uplink, and it is possible that multiple users choose the same preamble sequence to transmit to the base station. Therefore, the conflict resolution mechanism is an important research direction in random access, and how to reduce the probability of conflicts and how to quickly resolve the conflicts that have already occurred is the key index affecting the performance of random access.

Figure 4:
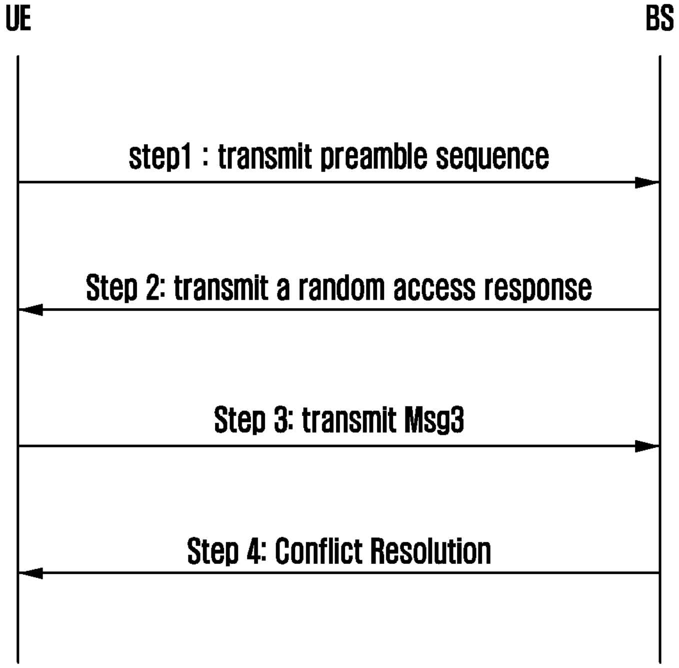
FIG. 4 is a schematic diagram showing random access procedure based on competition in LTE-A according to an embodiment of the present invention.

The Contention-based Random Access in LTE-A is divided into four steps, as shown in FIG. 4. In the first step, the UE transmits a preamble sequence. For example, the user randomly selects a preamble sequence from the preamble sequence resource pool and transmits it to the base station. The base station detects the correlation of the received signals, so as to identify the preamble sequence sent by the user. In the second step, the base station transmits a random access response to the UE. For example, the base station transmits a Random Access Response (RAR) to the user, which includes a random access preamble sequence identifier, a timing advance instruction determined according to the time delay estimation between the user and the base station, a cell-radio network temporary identifier (C-RNTI), and time-frequency resources allocated for the next uplink transmission of the user. In the third step, the UE transmits a message 3. For example, the user transmits the message 3 (Msg3) to the base station according to the information in RAR. Msg3 contains information such as user terminal identification and RRC link request, wherein the user terminal identification is unique to the user and is used to resolve conflicts. In the fourth step, the base station transmits a conflict resolution to the UE. For example, the base station transmits a conflict resolution identifier to the user, which includes the user terminal identification that won in the conflict resolution. After the user detects his own identification, it upgrades the temporary C-RNTI to C-RNTI, transmits an ACK signal to the base station, completes the random access procedure, and waits for the scheduling of the base station. Otherwise, the user will start a new random access procedure after a delay.

For the Contention-free Random Access, because the base station knows the user identification, the preamble sequence can be assigned to the user. Therefore, when transmitting the preamble sequence, the user does not need to randomly select the sequence, but will use the assigned preamble sequence. After detecting the assigned preamble sequence, the base station will transmit corresponding random access response, including timing advance information, uplink resource allocation and other information. After receiving the random access response, the user thinks that the uplink synchronization has been completed and waits for further scheduling by the base station. Therefore, the Contention-free Random Access includes two steps: step one is to transmit the preamble sequence; and step two is to transmit the random access response.

Random access procedure in LTE is suitable for the following scenarios:

1. Initial access in RRC_idle;
2. Re-establish RRC connection;
3. Cell handover;
4. Downlink data arriving and requesting random access procedure in RRC connection state (when the uplink is asynchronous);
5. Uplink data arriving and requesting random access procedure in RRC connection state (when the uplink is asynchronous or no resource in PUCCH resources is allocated to scheduling request);
6. Positioning.

In some network systems, such as 5G NR system, when beamforming is adopted and/or coverage is limited, a transport block (TB) can be transmitted by using resources in multiple time slots, which is denoted as TB over Multi-Slot (TBoMS), so as to obtain lower coding rate and higher coding gain, and the purpose of coverage improvement (performance improvement) can be achieved. However, when other uplink transmission signals conflict with the time unit occupied by the transmission data block, the power allocation may be re-allocated. How to optimize the power allocation to ensure the performance of using multiple time slots to transmit a single TB is a problem to be solved. At the same time, if the other uplink signals are uplink control channels, it is possible that UCI information carried on the control channel can be directly loaded on the TBoMS PUSCH for transmission, and how to ensure the performance of UCI and PUSCH in this situation is also a problem to be solved.

Figure 5:
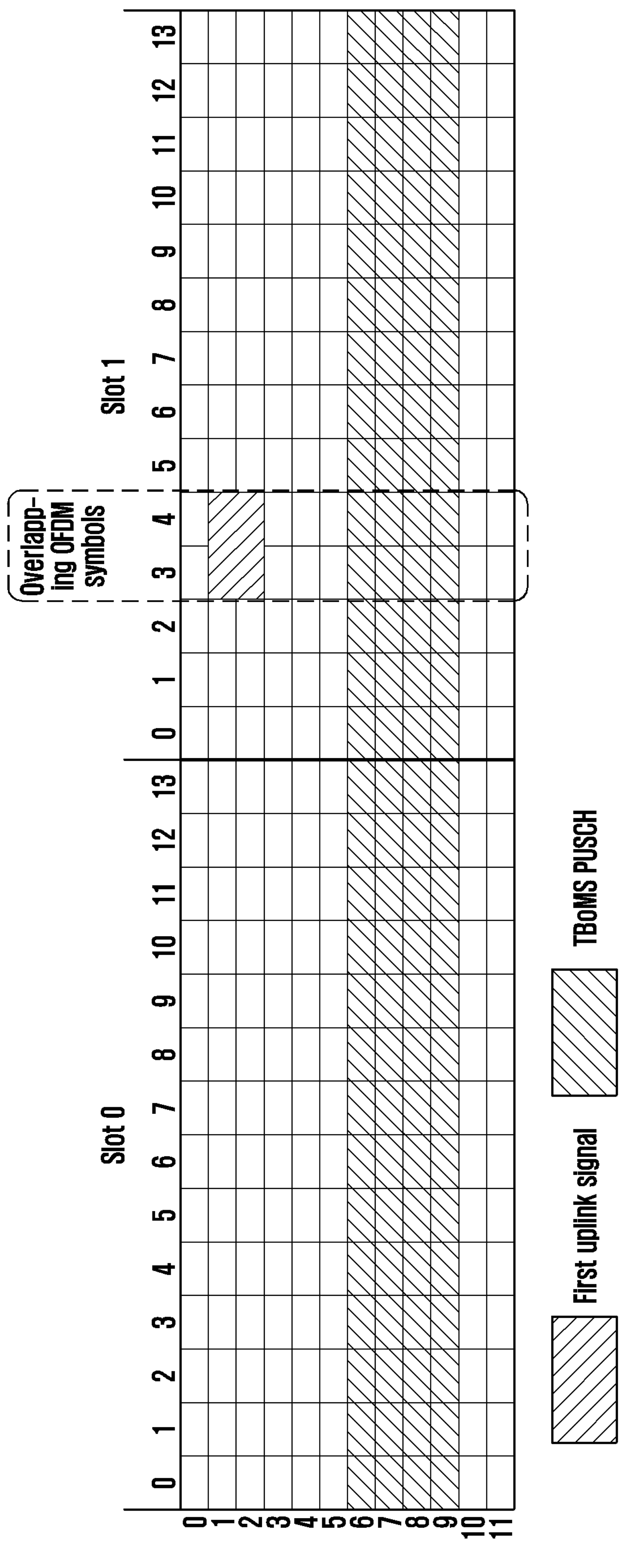
FIG. 5 is a diagram showing an example of TboMS PUSCH overlapping with a first uplink signal according to an embodiment of the present invention.

In the situation of supporting the transmission of TBoMS (Transport Block Over Multip-Slot) PUSCH, the PUSCH occupying multiple time slots may overlap with other uplink signals (such as PUCCH, PUSCH, SRS, PRACH, etc., which are referred to as the first uplink signal in the present invention). As shown in FIG. 5, one of the first uplink signals in OFDM 3 and 4 of slot1 overlaps with the PUSCH of TBOMS. Two overlapping uplink signals may have their own calculated required power, for example, the power required by the first uplink signal is P_UL1, while the power required by the TBoMS PUSCH is P_TBoMS. However, the power of UE is limited, and the maximum transmittable power is P_max. In the traditional practice, when P_UL1+P_TBoMS is greater than P_max, it is necessary to determine to allocate power to the uplink signal with high priority for transmitting according to the priority of the first uplink signal and the overlapped PUSCH. For example, if the first uplink signal is the PRACH of the Primary Cell, then its priority is higher than the PUSCH, and the power is prioritized for PRACH transmitting. Therefore, the power transmitted by the PUSCH of TBoMS will be insufficient. The present invention will introduce a power adjustment method for the signal transmission of the TBoMS PUSCH.

According to one aspect of the present invention, the power adjustment method may include at least one of the following:

when PUSCH of TBoMS has low priority,

Reducing the transmission power of the overlapping part. As shown in FIG. 5, only on OFDM 3 and 4 of slot1, the UE reduces the transmission power to give priority to the transmission of the first uplink signal (that is, the uplink signal with higher priority);

Reducing the transmission power in the time slot where the overlapping part is located. As shown in FIG. 5, the power is reduced on OFDM symbols 0 to 13 transmitted in slot1 where the overlapping part is located;

Reducing the transmission power in all time slots. As shown in FIG. 5, power transmission is reduced on symbols in all time slots (including slot0 and slot1);

Particularly, the above three power reduction methods are used by UE up to UE implementation;

Specifically, the transmission power reduction may have at least one of the following ways:

Giving priority to the power required by the first uplink signal, that is, the maximum power available for TBoMS is P_max−P_UL1. If P_max−P_UL1 is not less than P_TBoMS, it is not necessary to reduce the power for TBoMS. If P_max−P_UL1 is less than P_TBoMS, the actual transmission power of the TBoMS PUSCH is P_max−P_UL1, that is, the power that UE needs to reduce is P_TBoMS−(P_max−P_UL1). In this way, it is possible that P_max−P_UL1=0, that is, if the first uplink signal uses all the power, then there is no power for the TBoMS PUSCH to transmit;

Giving priority to the power required by the first uplink signal but also ensuring the minimum required transmission power P_TBoMS_min of TBoMS PUSCH. The minimum required transmission power P_TBoMS_min of the TBoMS PUSCH can be configured by network equipment (through high-level signaling and/or DCI) or preset by the system.

If P_max−P_UL1 is not less than P_TBoMS_min (that is, the remaining power is not less than the minimum required value of TBoMS), the maximum available power of TBoMS is P_max−P_UL1, and if P_max−P_UL1 is not less than P_TBoMS, it is not necessary to reduce power for TBoMS. If P_max−P_UL1 is less than P_TBoMS, the actual transmission power of the TBoMS PUSCH is P_max−P_UL1, that is, the power that UE needs to reduce is P_TBoMS−(P_max−P_UL1). And/or If P_max−P_UL1 is less than P_TBoMS_min (i.e., the remaining power does not meet the minimum value of TBoMS), then the transmission power of the TBoMS PUSCH is P_TBoMS_min, while the transmission power of the first uplink signal is P_max−P_TBoMS_min. At this time, although the first uplink signal cannot be transmitted according to the expected power, the transmission of the first uplink channel has been ensured to the greatest extent.

Figure 6:
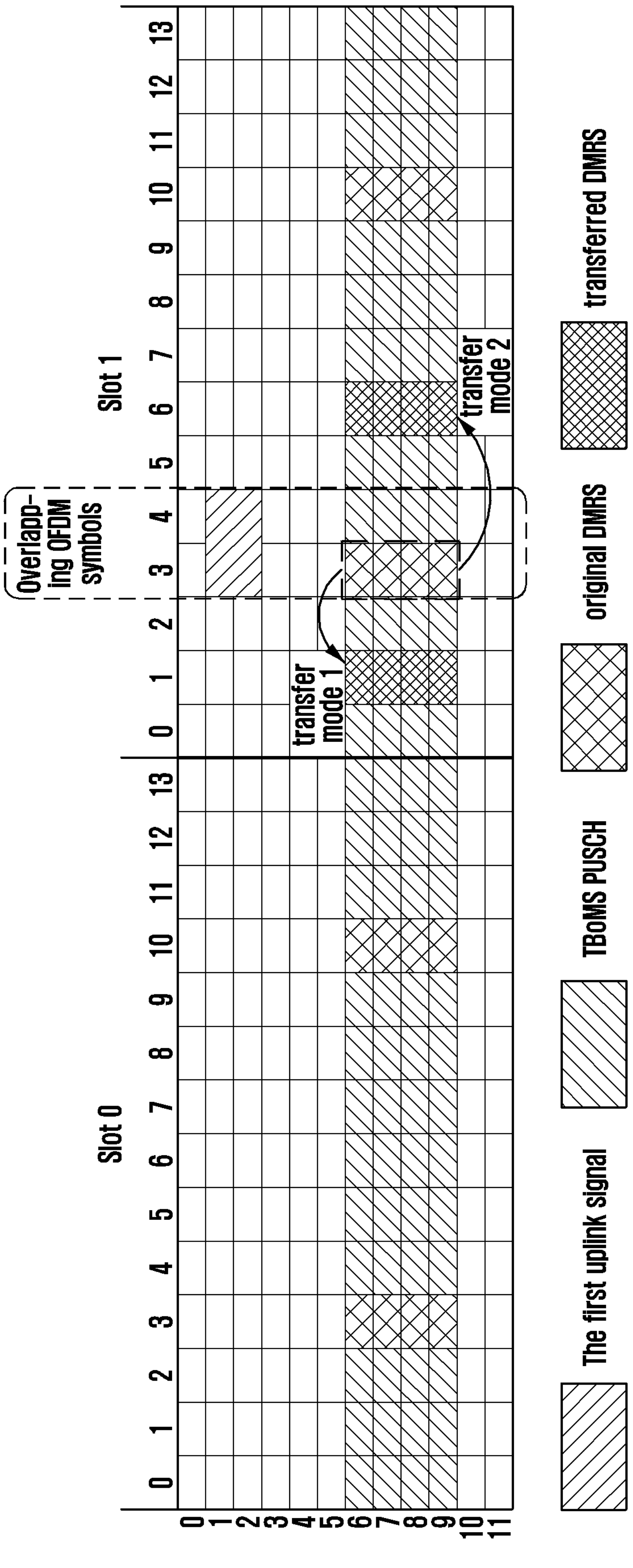
FIG. 6 is a diagram showing an example of overlapping DMRS symbol transfer according to an embodiment of the present invention.

Particularly, if the overlapped symbols contain DMRS symbols, the processing mode of the overlapped DMRS symbols includes at least one of the following:

Reducing the power according to the power reduction values of other TBoMS PUSCH data symbols;

Normal transmission without power reduction; (i.e. the priority is higher than the first uplink signal);

Transferring the overlapping DMRS symbols, and the transferring mode may include at least one of the following:

Transferring mode 1: transferring the overlapping DMRS to the nearest (first) OFDM symbol before the start position of the (current or all) overlapping symbols plus Ngap. As shown in transfer mode 1 in FIG. 6, Ngap=1 symbol, and the overlapping DMRS symbols are transferred from symbol 3 to symbol 1. The advantage of setting Ngap value is that it takes a certain amount of time for UE to increase or decrease power, and Ngap time can be used to resist the above time. In particular, the Ngap value can default to 0, that is, the overlapping DMRS symbols are transferred from symbol 3 to symbol 2;

Transferring mode 2: transferring the overlapping DMRS to the nearest (first) OFDM symbol after the end position of the (current or all) overlapping symbol plus Ngap. As shown in transferring mode 2 in FIG. 6, Ngap=1 symbol, the overlapping DMRS symbols are transferred from symbol 3 to symbol 6. The advantage of setting Ngap value is that it takes some time for UE to increase or decrease power, and Ngap time can be used to resist this time. In particular, the Ngap value can default to 0, that is, the overlapping DMRS symbols are transferred from symbol 3 to symbol 5.

Improving the priority of the TBoMS PUSCH. For example, according to the current method, the PRACH priority of Pcell is greater than PUCCH or PUSCH with high priority, then greater than PUCCH or PUSCH with HARQ, then greater than PUCCH or PUSCH with CSI, then greater than PUSCH without HAR or CSI or PUSCH of message A (in two-step random access); and then greater than SRS or PRACH not transmitted on Pcell. It shows that when TBoMS does not carry UCI information (HARQ and/or CSI), the priority is relatively low. The specific way to improve the priority of the TBoMS PUSCH can be at least one of the following:

Improving the TBoMS PUSCH to the same level as PUCCH or PUSCH that transmits CSI. This method not only ensures the higher priority of HARQ ACK PUCCH, but also improves the priority of the TBoMS PUSCH without UCI information comparing with that of PUSCH without UCI information.

Improving the TBoMS PUSCH to the same level as PUCCH or PUSCH that transmits HARQ-ACK information. In this way, the priority of the TBoMS PUSCH is greater than that of PUCCH and PUSCH with CSI, and the performance of TBoMS is further guaranteed.

Determining the priority mode used by obtaining the configuration indication of the base station.

In addition, because the base station may use shared DMRS to demodulate and decode the data of the TBoMS PUSCH, that is, DMRS in multiple different time slots/transmissions can perform joint channel estimation. However, if the power of DMRS in a certain transmission changes, the base station needs to know this information to adjust the operation of sharing DMRS. Considering for the above situation, the embodiment also provides a way for the UE to feedback power reduction related information to the base station, specifically, there is at least one of the following ways:

The feedback power reduction related information is reported on PUSCH transmission in the first time slot after the TBoMS PUSCH with reduced power;

The feedback power reduction related information is reported on PUSCH transmission in the last time slot in the TBoMS PUSCH;

Among the above methods, the specific reporting methods include at least one of the following:

Puncturing the RE (resource element) of part of PUSCH to transmit the feedback power reduction related information;

Transmitting the feedback power reduction related information on a pre-set RE. For example, in PUSCH transmission, there is a pre-set RE value for transmitting information related to potential power reduction. If there is no such information to be transmitted, it will be left blank or used for PUSCH transmission. And if there is this information to be transmitted, responding transmission would be performed.

Particularly, in the above methods, the UE can report and feedback power reduction related information only when a certain timeline is met, for example, in the first PUSCH transmission after T1 time after the TBoMS PUSCH with reduced power. Furthermore, if there is no PUSCH transmission belonging to the TB after T1 time after the TBoMS PUSCH with reduced power, the UE can give up reporting the power reduction related information, or report the power reduction related information in the PUSCH of the next repeated transmission of the TB, or report the power reduction related information in the PUSCH of the next TB transmission;

The power reduction related information may include at least one of the following:

The size of power reduction;

The size of time unit for power reduction (such as the number of time slots and/or OFDM symbols for power reduction);

The position of the time unit for power reduction (for example, the index of the time slot and/or the index of OFDM symbols for power reduction);

Whether or not the power reduction operation has been performed (for example, 1 bit indicates that "1" indicates that the power reduction has been performed, and "0" indicates that the power reduction has not been performed).

In addition, there is a type of first uplink signal, i.e., PUCCH, in the scene where the first uplink signal overlaps with the TBoMS PUSCH. The UCI information carried on the PUCCH can be multiplexed and transmitted on the TBoMS PUSCH when PUCCH overlaps with the TBoMS PUSCH. Specifically, the multiplexing mode of PUCCH and the TBoMS PUSCH includes one or more of the following combined operation modes:

Determining the number of resources occupied by UCI (for example, the number of RES). In the traditional way, there are two ways to calculate the number of UCI RE, one is to calculate the number of resources (for example, the number of REs) that can be used to multiplex UCI transmission on PUSCH, which is expressed as N_pusch_uci, the other is to calculate the number of resources (N_pucch_uci) expected to be occupied by UCI carried on PUCCH. In the process of real multiplexing, min{N_pusch_uci, N_pucch_uci}, which is the smaller one, will be used for multiplexing transmission of UCI on PUSCH. For the number of resources occupied by UCI, the invention provides the following new methods, specifically, one or more of the following:

Using the number of PUSCH REs available in the slot where the TBoMS PUSCH overlapping with PUCCH is located to calculate the number of REs available for multiplexing UCI transmission. For example, in FIG. 7, if the PUCCH overlaps with the PUSCH on slot2 of TBoMS, the number of PUSCH REs on slot2 is used to calculate the number of REs available for multiplexing UCI transmission. Preferably, when the N_pusch_uci calculated according to the PUSCH on slot2 is less than N_pucch_uci, that is, when the number of REs that can be used to transmit UCI on the overlapping PUSCH is less than the number of resources expected to be occupied by UCI, the following methods (one or more) are jointly adopted for UCI multiplexing, that is, the PUSCH on the overlapping time slot is preferentially multiplexed; if the resources of the PUSCH on the currently overlapping time slot are insufficient, all UCIs (or the part beyond the N_pusch_uci supported by the PUSCH on the currently overlapping time slot) are extended to be multiplexed on the PUSCH in other time slots;

Using the number of PUSCH REs available in the slot where the TBoMS PUSCH overlapping with PUCCH is located and the slots before that to calculate the number of REs available for multiplexing UCI transmission. For example, in FIG. 7, if the PUCCH overlaps with the PUSCH in slot2 of TBoMS, the number of PUSCH REs in slot0, slot1 and slot2 is used to calculate the number of REs that can be used to multiplex UCI transmission;

Using the number of PUSCH REs available in the slot where the TBoMS PUSCH overlapping with PUCCH is located and the slots after that to calculate the number of REs available for multiplexing UCI transmission. For example, in FIG. 7, if the PUCCH overlaps with the PUSCH in slot2 of TBoMS, the number of PUSCH REs in slot2 and slot3 is used to calculate the number of REs that can be used to multiplex UCI transmission;

Using the number of PUSCH REs available in all time slots where the TBoMS PUSCH overlapping with PUCCH is located to calculate the number of REs available for multiplexing UCI transmission. For example, in FIG. 7, if the PUCCH overlaps with the PUSCH in slot2 of TBoMS, the number of all PUSCH REs in slot0~slot3 are used to calculate the number of REs that can be used to multiplex UCI transmission.

Figure 7:
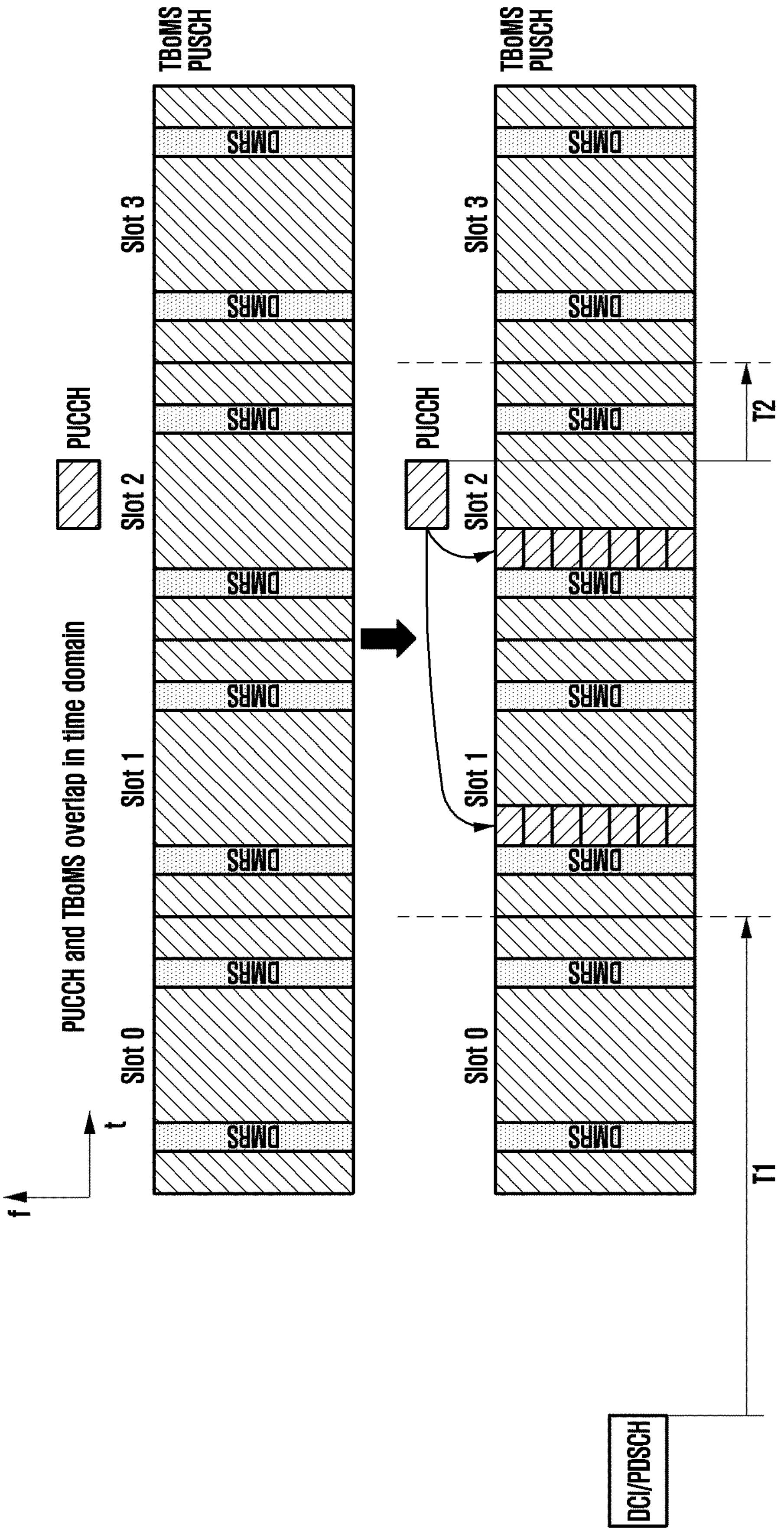
FIG. 7 is an example diagram showing UCI RE determination according to an embodiment of the present invention.

Preferably, when calculating the number of REs that can be used to multiplex UCI transmission, the number of PUSCH REs used needs to meet certain timing requirements, specifically, including at least one of the following:

The time interval T1 between the first symbol of PUSCH (or time slot where it is located) used for multiplexing UCI and the last symbol of DCI or PDSCH (or time slot where it is located) corresponding to PUCCH should not be less than (or greater than) the first time threshold. That is, only the PUSCH in the time slot after the last symbol+the first time threshold of the DCI or PDSCH (or time slot where it is located) can be used for UCI multiplexing. As shown in FIG. 7, the time between the first symbol of PUSCH in slot0 and DCI/PDSCH is too small to meet the first time threshold. When slot1 can meet the timing requirements, then PUSCH in slot1 and slots after slot1 can be used for UCI multiplexing;

The time interval T2 between the first symbol (or the last symbol) of PUSCH (or time slot where it is located) used for multiplexing UCI and the last symbol (or the first symbol) of PUCCH (or the corresponding DCI or PDSCH (and/or its the time slot)) is less than (not greater than) the second time threshold. That is, only the PUSCH in slot before the last symbol of PUCCH+ the second time threshold can be used for UCI multiplexing. For example, as shown in FIG. 7, the time interval T2 between the first symbol of slot3 and the last symbol of PUCCH is greater than the second threshold value, so the PUSCH in it is not used to calculate the number of REs that can be used to multiplex UCI transmission;

For example, as shown in FIG. 7, the number of PUSCH REs in slot1 and slot2 that meet the above two conditions at the same time is used to calculate the number of REs that can be used to multiplex UCI transmission;

The time slot mentioned in the above methods can be replaced by other time units or a PUSCH transmission opportunity (that is, the time-frequency resources used for transmitting one PUSCH). The symbols described in the above methods can be replaced by other time units;

Particularly, if there are multiple PUCCHs overlapping with the TBoMS PUSCH, the processing methods include one or more of the following:

Each PUCCH is processed separately,

The plurality of PUCCHs in the same time slot are combined and multiplexed on PUSCH;

After determining the number of REs that can be used for UCI multiplexing on PUSCH, UE needs to determine the mapping mode of (modulation symbols of) UCI and the location of REs mapped by (modulation symbols of) UCI, which includes at least one of the following specific ways:

The UE determines the number of REs of UCI to be multiplexed in each time slot. That is, if there are multiple PUSCHs in slots to multiplex UCI information, for example, if it is necessary to multiplex N_pucch_msym=100 UCI modulation symbols, then the UE:

Maps all UCI modulation symbols together; and/or

Splits UCI modulation symbols into one or more parts for mapping in different time slots in a certain mode. The certain mode includes at least one of the following:

Splitting evenly according to the number of slots N_slot. For example, if N_slot=2 slots are used for UCI multiplexing, then the number of UCI modulation symbols multiplexed in each slot is N_pucch_msym/N_slot=100/2=50;

Splitting proportionally according to the OFDM symbol number of the DMRS of PUSCH in the time slots. It can be represented as [X] UCI modulation symbols calculated in one time slot, and [X] represents the rounding operation (which can be rounded up or rounded down) on X. Preferably, the UCI modulation symbols multiplexed by PUSCH in the last time slot are equal to N_pucch_msym−the number of UCI modulation symbols multiplexed by PUSCH in other time slots. For example, if N_slot=2, where the PUSCH of the first slot has 4 DMRS symbols and the PUSCH of the second slot has 2 DMRS symbols, then N_pucch_msym_1$^{st}$=[4/(4+2)*N_pucch_msym] UCI modulation symbols are multiplexed in the PUSCH of the first slot. For example, when [X] is used to round up, [4/(4+2)*N_pucch_msym]=67, and the number of UCI modulation symbols multiplexed in the PUSCH of the second slot is N_pucch_msym_2$^{nd}$=N_ pucch_msym−N_pucch_msym_1$^{st}$. Furthermore, preferably, when the content of UCI is HARQ-ACK message, the method described in this article will be used. It is conducive to the detection and decoding performance of HARC-ACK information when the HARQ-ACK is mapped with DMRS as much as possible;

Splitting proportionally according to the number of REs of PUSCH in the time slot. It can be represented as [X] UCI modulation symbols calculated in one time slot, and [X] represents the rounding operation (which can be rounded up or rounded down) on X. Preferably, the UCI modulation symbols multiplexed by PUSCH in the last time slot are equal to N_pucch_msym−the number of UCI modulation symbols multiplexed by PUSCH in other time slots. For example, if N_slot=2, where the PUSCH of the first slot has 100 REs and the PUSCH of the second slot has 50 REs, then N_pucch_msym_1$^{st}$=[100/(100+50)*N_pucch_msym] UCI modulation symbols are multiplexed in the PUSCH of the first slot. For example, when [X] is used to round up, [100/(100+50)*N_pucch_msym]=67, and the number of UCI modulation symbols multiplexed in the PUSCH of the second slot is N_pucch_msym_2$^{nd}$=N_pucch_msym−N_pucch_msym_1$^{st}$. Particularly, the REs are REs for transmitting data (e.g., excluding DMRS REs and/or vacant REs). Furthermore, preferably, when the content of UCI is CSI message, the method described in this article will be used;

After determining the number REs of UCI to be multiplexed in the time slot, UE maps the UCI modulation symbols on the corresponding PUSCH, and the mapping methods include at least one of the following:

Determining REs for mapping UCI modulation symbols from the first symbol on PUSCH in the time slot for mapping UCI according to the sequence of time from front to back. Particularly, the REs for mapping UCI modulation symbols are determined from the first non-DMRS symbol after the (first) DMRS. This method can put UCI at the front as much as possible, so that the UCI can be received by the base station as soon as possible;

Mapping UCI modulation symbols preferentially on the REs closest to the DMRS symbols. And the specific priority order of time domain mapping (priority from highest to lowest) can be (the following method is an example, and different time domain mapping priorities can be achieved by changing the priorities of the following items):

DMRS symbol;

The first non-DMRS symbol after the DMRS symbol;

The first non-DMRS symbol before the DMRS symbol;

Second non-DMRS symbol after DMRS symbol;

Second non-DMRS symbol before DMRS symbol

Figure 8:
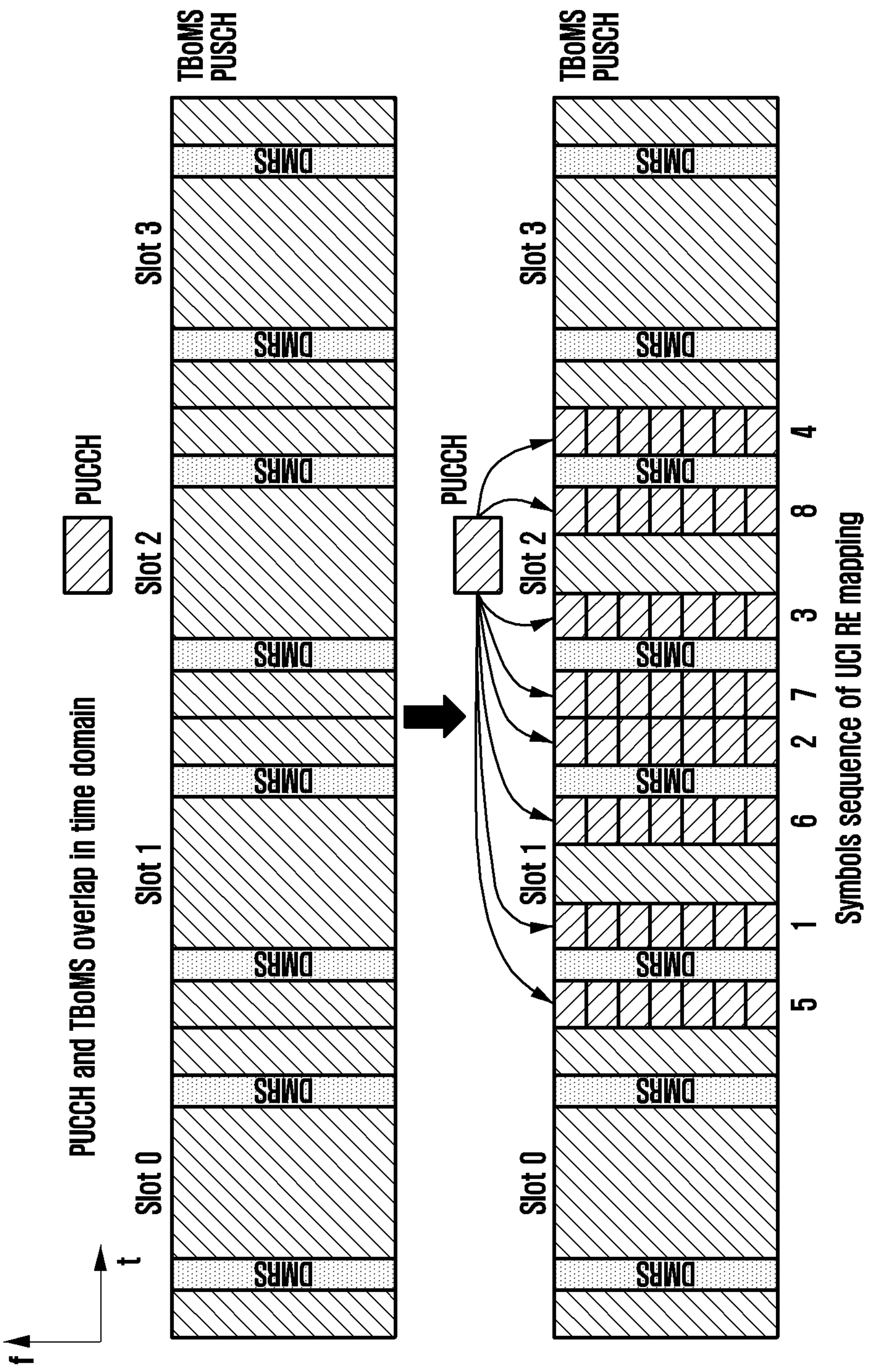
FIG. 8 is an example diagram of UCI RE mapping according to an embodiment of the present invention.

As shown in FIG. 8, PUCCH needs to be mapped on PUSCH in slot1 and slot2. If all UCI modulation symbols are mapped together in this method, the sequence of mapped time domain symbols is as follows:

Sequence Index 1: the first non-DMRS symbol after the first DMRS symbol in slot1, Sequence Index 2: the first non-DMRS symbol after the second DMRS symbol in slot1, Sequence Index 3: the first non-DMRS symbol after the first DMRS symbol in slot2, Sequence Index 4: the first non-DMRS symbol after the second DMRS symbol in slot2, Sequence Index 5: the first non-DMRS symbol before the first DMRS symbol in slot1, Sequence Index 6: the first non-DMRS symbol before the second DMRS symbol in slot1, Sequence Index 7: the first non-DMRS symbol before the first DMRS symbol in slot2, Sequence Index 8: the first non-DMRS symbol before the second DMRS symbol in slot2.

Figure 9:
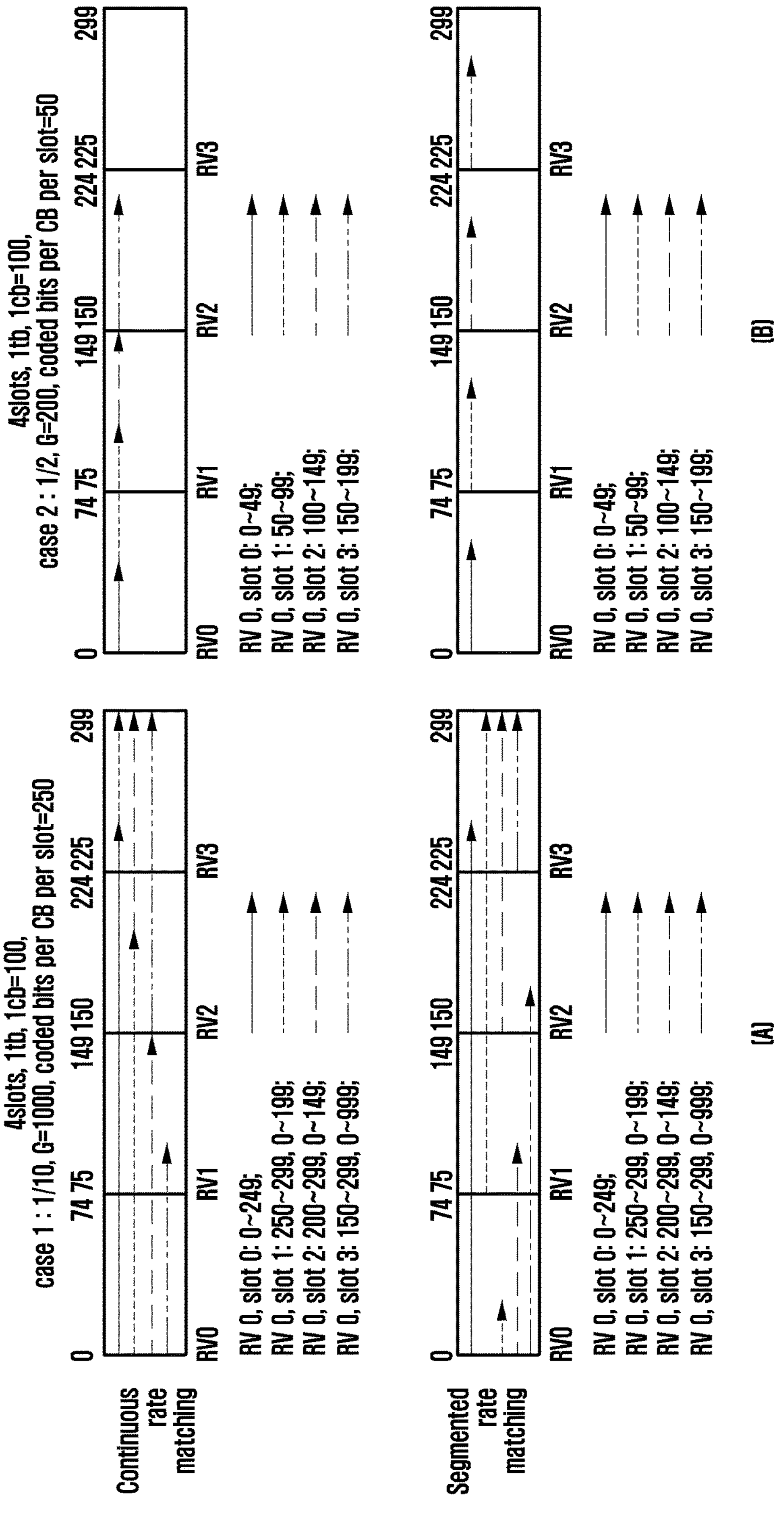
FIG. 9 is an example diagram showing continuous rate matching and split rate matching according to an embodiment of the present invention.

In the case of supporting transmission of TBoMS (Transport Block over Multi-Slot) PUSCH, one TB can be transmitted on multiple time slots. In the process of preparing signals for transmission, at least one of the following operations needs to be handled:

Rate matching (RM), in which, the rate matching is to extract a certain number of coded bits from the coded bit sequence by calculating with the number of REs of the PUSCH for the actual transmitted signal, for the actual transmission of the current PUSCH. Specifically, the UE needs to determine the starting position of rate matching output bits and the number of output bits. The specific methods include at least one of the following:

Continuous rate matching (Continuous RM), in which when the PUSCH of TBoMS occupies multiple time slots (or multiple transmission occasions, which can be replaced by transmission occasion in the situation using time slot as example), the starting position of rate matching output bits in the first time slot is calculated from a given RV (such as RV0). And the starting position of rate matching output bits in the other slot(s) is a position next to the ending position of rate matching output bits in the previous time slot. For example, if the ending position of rate matching output bits in the previous time slot is N, the starting position of rate matching output bits in the current time slot is N+1. The number of output bits after rate matching in one time slot is obtained by multiplying the number of REs (N_RE) used for transmitting data in this time slot (that is, the number of modulation symbols it carries) by the modulation order (Q) of symbols. Especially, when there are N (N>1) CBs in a TB, the number of output bits after rate matching in one time slot is obtained by dividing the number of REs (N_RE) used for transmitting data in this time slot (that is, the number of modulation symbols it carries) by N, and then multiplying by the modulation order of symbols, that is, N_RE*Q/N. As shown in two examples in the upper part of FIG. 9, the output bits in the first time slot start from the starting position determined by RV0, and the output bits in other slot(s) start from the end of the output bits in the previous time slot. The output bits in multiple time slots are continuous according to this feature. The advantage of this method is that the systematic bit information bits in the coded bits are extracted as much as possible, which is beneficial to the decoding performance;

Segmented rate matching (Segmented RM), in which when the PUSCH of TBoMS occupies multiple time slots, the starting position of rate matching output bits of each time slot is obtained from the determined RV sequence. For example, if one TBoMS PUSCH occupies four time slots and the determined RV sequence is 0,2,3,1, then the output bits start according to the starting position determined by RV0 in slot 0, the output bits start according to the starting position determined by RV2 in slot 1, the output bits start according to the starting position determined by RV3 in slot 2, and the output bits start according to the starting position determined by RV1 in slot 3. The method to determine the RV sequence can be obtained by the base station configuration or by a pre-fixed way. Among them, the way of determining the starting position by RV is calculated by looking up the table, in which each row in the table will indicate an RV serial number and its corresponding starting position (or the calculation formula of the starting position). Specifically, the method of extracting the number of bits after rate matching in one time slot is the same as that in continuous rate matching (Continuous RM), so it will not be repeated here. As shown in the two examples in the lower part of FIG. 9, the determined RV sequence is RV 0, 1, 2, 3;

Alternatively, the multiple time slots occupied by one TBoMS PUSCH can be replaced by multiple transmission occasions occupied by one TBoMS PUSCH, and one transmission occasion is a given time unit and/or frequency domain unit;

Segmented RM is adopted when condition 1 is met. Condition 1 can be one or a combination of the following:

The number of slot occupied by the TBoMS PUSCH, and the number of PUSCH transmissions is less than (not more than) N1;

The number of RVs (redundancy version) is less than (not more than) N2;

In particular, when the actual code rate (R actual) of PUSCH transmission is less than (not more than) the first threshold value, the threshold value may be the code rate (R_mother) of mother code, for example, R_mother=⅓ or ⅕ in LDPC;

The ratio between the number of RVs and the number of slot occupied by the TBoMS PUSCH is greater than (not less than) the ratio between the actual code rate of PUSCH transmission and the code rate of PUSCH mother code, for example, N_RV/N_L>R actual/R_mother.

Determining the segmented RM. When condition 1 is met, the UE performs at least one of the following operations:

Enabling a new RV design. For example, if the old RV design is 4 parts, i.e., RV0, 1, 2, 3, then the new RV design is 8 parts, i.e., RV0, 1, 2, 3, 4, 5, 6, 7;

Enabling a new RV sequence. For example, if the old RV sequence is 0,2,3,1, then the new RV sequence is RV 0,0,0,0; or combining with a new RV design, that is, RV0, 2, 3, 1, 4, 6, 7, 5;

Bit interleaving, in which the bit interleaving is to interleave the obtained coded bits according to a certain interleaving pattern. Specifically, there are at least one of the following ways:

The coded bits are coded bits after rate matching;

The coded bits are coded bits on all time slots occupied by TBoMS, that is, the coded bits on all time slots on one TBoMS PUSCH are interleaved;

The coded bits are the coded bits on current time slot from all time slots occupied by TBoMS, that is, the coded bits on each time slot on one TBoMS PUSCH are interleaved on their respective time slots;

The interleaving pattern is preset or obtained by the system through network side configuration.

The determination of the transmission beam, that is, the determination of the transmission beam of each PUSCH in one or more time slots occupied by one TBoMS PUSCH, and it includes one of the following specific ways (can be combined or replaced with each other):

One TBoMS PUSCH uses one transmission beam. For example, if the transmission beam of the first PUSCH in one or more time slots occupied by one TBoMS PUSCH is determined by UE, then the other PUSCH transmission in the one or more time slots is the same as the determined transmission beam of the first PUSCH; or the transmission beam of each PUSCH in one or more time slots occupied by one TBoMS PUSCH is determined by UE, especially, the transmission beam of each PUSCH is the same; or the transmission beams of all PUSCH in one or more time slots occupied by one TBoMS PUSCH are determined according to the beam information configured by a base station (i.e., determined by using the same beam information configured by one base station), the beam information configured by the base station includes at least one of the following: receiving uplink transmission beams corresponding to downlink reception beams of one or more SSBs (such as SSB index specified by the base station or SSB index with maximum RSRP), receiving uplink transmission beams corresponding to downlink reception beams of one or more SCSI-RS (such as CSI-RS index specified by the base station or CSI-RS index with maximum RSRP), or transmitting uplink transmission beams of one or more SSRS (such as SRS index specified by the base station);

Preferably, when the UE and/or the base station have only one antenna panel (or when the UE is configured with single beam transmission), the UE determines a transmission beam as described above; on the other hand, when the UE and/or the base station have more than one antenna panels (or when the UE is configured with multibeam transmissions), the UE can determine the transmission beam of each PUSCH in one or more time slots occupied by one TBoMS PUSCH as described above; that is, the transmitting beams of each PUSCH in one TBoMS PUSCH may be the same or different; preferably, when the transmission beam of each PUSCH is determined according to the beam information configured by the base station, each PUSCH may have separate beam information configured by the base station;

The determination of the timing advance value of the transmission signal in TBoMS includes at least one of the following processes:

For the received timing advance value (or timing advance modulation value) in time slot n, the UE applies the received timing advance value (or timing advance value obtained according to the received timing advance modulation value) in uplink signal transmission starting from the starting position of the n+k+1$^{th}$ time slot, where $$k = \lceil N_{slot}^{subframe\mu} \cdot (N_{T,1} + N_{T,2} + N_{TA,max} + 0.5)/T_{sf} \rceil,$$

$N_{T,1}$ is the processing time of PDSCH corresponding to UE processing capacity 1 when additional PDSCH DMRS is configured, which corresponds to the specific millisecond time of N1 OFDM symbols, $N_{T,2}$ is the processing time of PUSCH corresponding to UE processing capacity 1, which corresponds to the specific millisecond time of N2 OFDM symbols, $N_{TA,max}$ is the maximum timing advance value that can be provided in the 12-bit timing advance command field, $$N_{slot}^{subframe\mu}$$

is the number of time slots contained in a subframe, and $T_{sf}$ is the millisecond time length corresponding to a subframe;

Preferably, when the uplink signal transmission is one TBoMS PUSCH transmission, and the obtained n+k+1$^{th}$ time slot is any one of one or more time slots occupied by the TBoMS PUSCH (or overlaps with any one of one or more time slots occupied by the TBoMS PUSCH), the UE applies the received timing advance value in the uplink signal transmission starting from the starting position of the n+k+delta+1$^{th}$ time slot, wherein the delta time slots are the difference between the n+k+1$^{th}$ time slot and the last time slot occupied by the TBoMS PUSCH, that is, in this case, the UE uses the same timing advance value in the TBoMS PUSCH (that is, there is no new timing advance value applied), and the received timing advance value is applied in the uplink signal transmission after the last time slot of the TBoMS PUSCH;

Preferably, when two adjacent time slots transmitted in one TBoMS PUSCH overlap due to the timing advance command, the UE does not apply the timing advance command; if the timing advance command does not cause two adjacent time slots to overlap, the UE can apply the timing advance value obtained by the timing advance command. Preferably, the adjacent time slots can be physically adjacent time slots or logically adjacent time slots in one TBoMS PUSCH. Alternatively, the multiple time slots occupied by one TBoMS PUSCH can be replaced by multiple transmission occasions occupied by one TBoMS PUSCH, and one transmission occasion is a given time unit and/or frequency domain unit. Preferably, the given time unit and/or frequency domain unit is a continuous time unit and/or a continuous frequency domain unit in a time slot;

In case of supporting transmission of TB OMS (Transport Block Over Multi-Slot) PUSCH, PUSCH occupying multiple slots may involve rate matching in a certain time unit (including bit selection and/or bit interleaving), wherein the certain time unit includes a single time slot (i.e., one time slot among a plurality of time slots used for one TBoMS PUSCH transmission); multiple time slots (i.e., partial time slots among the plurality of time slots for one TBoMS PUSCH transmission); or all time slots (i.e., all time slots among the plurality of time slots for one TBoMS PUSCH transmission). Different UE implementation methods may use different time units for rate matching processing, and UE and base station need to keep consistent understanding to receive and demodulate data signals correctly. In this embodiment, a single time slot and all time slots are taken as examples to describe the method, but the method can be extended to other time units, not limited to the above three examples. The method is performed, By reporting the capabilities of the UE. For example, the UE reports that its capabilities support the rate matching of a single time slot and/or the rate matching of all time slots. Specifically, there are one or more of the following ways:

With N=1 bit, wherein 0 indicates that the rate matching of a single time slot is supported, and 1 indicates that the rate matching of all time slots is supported; or vice versa. The value of N can be determined by the number of time units that can be supported, for example, if N=2 bits, then it can support four different time slot numbers. This method can clearly inform the UE to select (or support) the only time unit used for rate matching, without subsequent configuration by the base station and additional signaling overhead;

By activation indication (enable or disable) or support indication, wherein,

For example, enable means that the rate matching of all time slots is supported and disable means that rate matching of a single time slot is supported. This method can clearly inform the UE to select (or support) the only time unit used for rate matching, and it does not need the subsequent configuration of the base station and extra signaling overhead. And it is suitable for the situation in which only two selectable time slot values exists.

For example, there is an activation indication or support indication (0 means no support, 1 means support) for any optional time slot value. For example, the rate matching of a single time slot can be 1, and the rate matching of all time slots is also 1, which means that UE supports both kinds of the rate matching, and the base station needs to make a clear configuration indication to select one of them for rate matching operation. By receiving from base station, the UE could have 1-bit indication of DCI (separated bit field, or redefinition by reusing existing bit field). As in the above example, "1" can represent supporting the rate matching of all time slots; and "0" may represent supporting the rate matching of a single time slot;

1-bit indication of UL grant;

In the case of supporting the transmission of TB OMS (Transport Block Over Multi-Slot) PUSCH, PUSCH occupying multiple slots may involve adjusting the transmission time, that is, applying the timing advance TA command (for example, it can be a 12 bit timing advance indication; or a 6 bit timing advance adjustment value). When the timing advance value TA1 is received at slot n, the UE needs to apply TA1 for uplink transmission after n+k+1 time slots, wherein the $$k = \lceil N_{slot}^{subframe,\mu} \cdot (N_{T,1} + N_{T,2} + N_{TA,max} + 0.5) / T_{sf} \rceil,$$

which is the maximum possible value including the processing time of the UE and TA. When n+k+1 time slots fall into one of the multiple time slots (taking M=4 time slots as an example) of the transmission of one TBoMS (n+k+1 is the second time slot in the TBoMS), the UE may Apply TA1 at the beginning of the first time slot. That is, the application time of TA1 is advanced, and TA1 is applied to the first uplink time slot of the transmission of TBoMS. This method has higher requirements for the capability of UE and is suitable for users with this capability; or Start to apply TA1 in the next slot after the last slot. That is, the application time of TA1 is postponed until the first subsequent uplink time slot after the transmission of the TBoMS is completed. This method does not require the UE to have stronger capabilities, and has the advantage of wide application.

Figure 10:
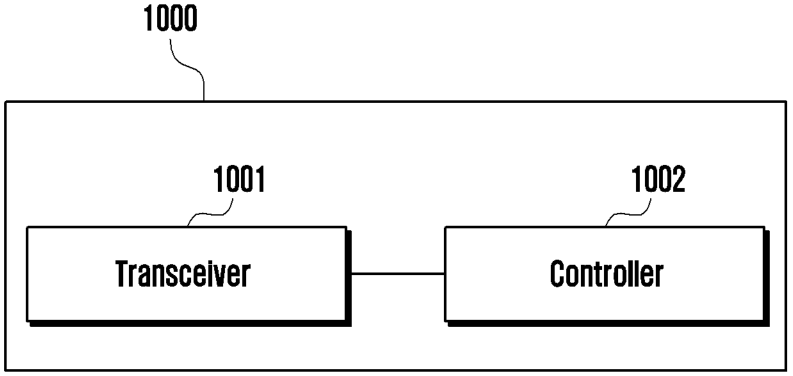
FIG. 10 is a schematic diagram showing user equipment that performs transmission of uplink signals according to an embodiment of the present invention.

FIG. 10 shows a simplified block diagram of a user equipment (e.g., a terminal) 1000 according to an embodiment of the present disclosure. It should be understood that, for the sake of brevity, only the components directly related to the present disclosure are shown, and other components that may be required are omitted in the drawings so as not to obscure the main points of the present disclosure.

The embodiment also provides a user equipment 1000 for transmitting uplink signals. The user equipment 1000 includes a transceiver 1001 and a controller 1002, wherein the transceiver 1001 is used for receiving signals from a base station and transmitting uplink signals to the base station. The controller 1002 is configured to receive signals from and transmit signals to the transceiver 1001. In addition, the controller 1002 is also configured to perform the first operation when the physical uplink shared channel of the transport block over the multiply slots (TBoMS PUSCH) overlaps with the first uplink signal, and transmit the TBoMS PUSCH signal and/or the first uplink signal, wherein the first operation includes adjusting the transmission power for signal transmission of the TBoMS PUSCH, increasing the priority of the TBoMS PUSCH, feeding back the information of power reduction to the base station and/or multiplexing uplink control information UCI carried by the first uplink signal on the TBoMS PUSCH for transmission.

Figure 11:
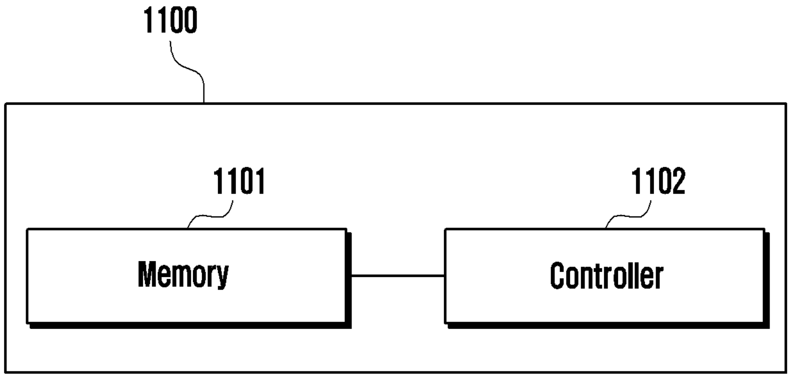
FIG. 11 is a schematic diagram showing an electronic device that performs transmission of an uplink signal according to an embodiment of the present invention.

FIG. 11 shows a simplified block diagram of an electronic device 1100 according to an embodiment of the present disclosure. It should be understood that, for the sake of brevity, only the components directly related to the present disclosure are shown, and other components that may be required are omitted in the drawings so as not to obscure the main points of the present disclosure.

The embodiment also provides an electronic device 1100 for signal transmission. The electronic device includes a memory 1101 and a controller 1102, and the memory 1101 stores computer-executable instructions. When the instructions are executed by the controller 1102, at least one method corresponding to the above embodiments of the disclosure is executed.

According to one aspect of the present invention, there is provided a method performed by a user equipment in a wireless communication system, comprising: performing a first operation when a transport block over multi-slot physical uplink shared channel TBoMS PUSCH overlaps with a first uplink signal; and transmitting the TBoMS PUSCH signal and/or the first uplink signal.

In another aspect of the present invention, there is provided a method performed by user equipment in a wireless communication system, wherein the first operation includes at least one of the following: adjusting the transmission power for signal transmission of the TBoMS PUSCH, increasing the priority of the TBoMS PUSCH, feeding back the information of power reduction to a base station, or multiplexing an uplink control information UCI carried by the first uplink signal on the TBoMS PUSCH.

In another aspect of the present invention, there is provided a method performed by user equipment in a wireless communication system, wherein the performing the first operation includes comparing the priorities of the TBoMS PUSCH and the first uplink signal, and performing the first operation according to the comparison result.

In another aspect of the present invention, there is provided a method performed by user equipment in a wireless communication system, wherein the adjusting the transmission power for signal transmission of the TBoMS PUSCH includes at least one of the following: reducing the transmission power of the overlapping part; reducing the transmission power in the time slot and/or transmission occasion where the overlapping part is located; reducing the transmission power in all time slots and/or transmission occasions; guaranteeing the required power of the first uplink signal; and guaranteeing the required power of the first uplink signal and guaranteeing the minimum required transmission power of the TBoMS PUSCH.

In another aspect of the present invention, there is provided a method executed by user equipment in a wireless communication system, wherein the guaranteeing the required power of the first uplink signal and guaranteeing the minimum required transmission power of the TBoMS PUSCH includes: if a maximum transmittable power of user equipment-the required transmission power of the first uplink signal (P_max−P_UL1) is not less than the minimum required transmission power of the TBoMS PUSCH (P_TBoMS_min), the maximum transmission power of TBoMS is equal to the maximum transmittable power of user equipment-the required power of the first uplink signal; and/or if the maximum transmittable power of the user equipment-the required power of the first uplink signal (P_max−P_UL1) is not less than the required power of TBoMS, the TBoMS does not need to reduce the power; and/or if the maximum transmittable power of user equipment-the required power of the first uplink signal (P_max−P_UL1) is less than the required power of TBoMS, the actual transmission power of the TBoMS PUSCH is the maximum transmittable power of user equipment-the required power of the first uplink signal; and/or if the maximum transmittable power of user equipment-the required power of the first uplink signal (P_max−P_UL1) is less than the minimum required transmission power of the TBoMS PUSCH (P_TBoMS_min), the transmission power of the TBoMS PUSCH is the minimum required transmission power of the TBoMS PUSCH, and the transmission power of the first uplink signal is the maximum transmittable power of user equipment-the minimum required transmission power of the TBoMS PUSCH (P_max−P_TBoMS_min).

In another aspect of the present invention, there is provided a method performed by user equipment in the wireless communication system, wherein the adjusting the transmission power for signal transmission of the TBoMS PUSCH includes: if the overlapping part includes DMRS symbols, performing one of the following methods: reducing power according to the power reduction values of other TBoMS PUSCH data symbols; without power reduction; or transferring the DMRS symbols overlapped.

In another aspect of the present invention, there is provided a method performed by user equipment in the wireless communication system, wherein the transferring the DMRS symbols overlapped includes transferring the DMRS symbols overlapped to OFDM symbols before the starting position of the symbols overlapped; or transferring the DMRS symbols overlapped to OFDM symbols after the ending position of the symbols overlapped.

In another aspect of the present invention, there is provided a method performed by user equipment in the wireless communication system, wherein the increasing the priority of the TBoMS PUSCH comprises: increasing the priority of the TBoMS PUSCH to a priority equal to the level of PUSCH or PUCCH transmitting CSI; increasing the priority of the TBoMS PUSCH to a priority equal to the level of PUSCH or PUCCH transmitting HARQ-ACK information; or determining the priority of the TBoMS PUSCH according to the configuration of the base station.

In another aspect of the present invention, there is provided a method performed by a user equipment in the wireless communication system, wherein feedback power reduction information to a base station includes: reporting feedback power reduction information on PUSCH transmission in the first time slot and/or transmission occasion after the TBoMS PUSCH with reduced power; or reporting feedback power reduction information on PUSCH transmission in the last time slot and/or transmission occasion in the TBoMS PUSCH.

In another aspect of the present invention, there is provided a method performed by a user equipment in the wireless communication system, wherein feeding back power reduction information to a base station includes: puncturing the resource element RE of PUSCH to transmit the feedback power reduction information; or transmitting the feedback power reduction information on a preset resource element RE.

In another aspect of the present invention, there is provided a method performed by a user equipment in the wireless communication system, wherein the feedback power reduction information includes at least one of the following: information related to the size of power reduction, information related to the size of time unit of power reduction, information related to the position of time unit of power reduction, and information related to whether or not power reduction operation has been performed.

In another aspect of the present invention, there is provided a method performed by a user equipment in the wireless communication system, wherein the multiplexing the uplink control information UCI carried by the first uplink signal on the TBoMS PUSCH comprises:

determining the number of resource elements REs occupied by uplink control information UCI; and/or determining the mapping mode of the uplink control information UCI and the position of the resource elements REs mapped by the uplink control information UCI.

In another aspect of the present invention, there is provided a method performed by a user equipment in the wireless communication system, wherein determining the number of resource elements REs occupied by the uplink control information UCI comprises at least one of the following: determining the number of REs for multiplexing UCI transmission by using the number of PUSCH REs available on the time slot and/or the transmission occasion where the TBoMS PUSCH overlapping with the PUCCH is located; determining the number of REs for multiplexing UCI transmission by using the number of PUSCH REs available on the time slot and/or the transmission occasion where the TBoMS PUSCH overlapping with the PUCCH is located and the time slots and/or the transmission occasions before that; determining the number of REs for multiplexing UCI transmission by using the number of PUSCH REs available on the time slot and/or the transmission occasion where the TBoMS PUSCH overlapping with the PUCCH is located and the time slots and/or the transmission occasions after that; or determining the number of REs for multiplexing UCI transmission by using the number of PUSCH REs available on all time slots and/or the transmission occasions on the TBoMS PUSCH overlapping with the PUCCH.

In another aspect of the present invention, there is provided a method performed by a user equipment in the wireless communication system, wherein the number of PUSCH REs used in calculating the number of REs for multiplexing UCI transmission meets at least one of the following timing requirements: a time interval T1 between a first symbol of PUSCH for multiplexing UCI and a last symbol of PDSCH or DCI corresponding to PUCCH is not less than a first time threshold; a time interval T2 between the first symbol of PUSCH for multiplexing UCI and the last symbol of PUCCH is less than a second time threshold.

In another aspect of the present invention, there is provided a method performed by a user equipment in the wireless communication system, wherein if there are multiple first uplink signals overlapping with the TBoMS PUSCH, each first uplink signal is multiplexed separately, or the multiple first uplink signals in the same time slot and/or transmission occasion are combined and multiplexed on PUSCH.

In another aspect of the present invention, there is provided a method performed by a user equipment in the wireless communication system, wherein the determining the mapping mode of the uplink control information UCI comprises: if there are PUSCHs of multiple time slots and/or transmission occasions to multiplex UCI information, all UCI modulation symbols are mapped together; and/or the UCI modulation symbols are split and mapped in different time slots and/or transmission occasions.

In another aspect of the present invention, there is provided a method performed by a user equipment in the wireless communication system, wherein splitting the UCI modulation symbols comprises: splitting according to the number of time slots and/or transmission occasions; splitting according to the number of OFDM symbols of DMRS of PUSCH in time slots and/or transmission occasions; and/or splitting according to the number of REs of PUSCH in time slots and/or transmission occasions.

In another aspect of the present invention, there is provided a method performed by a user equipment in the wireless communication system, wherein the mapping mode comprises at least one of the following: determining RE for mapping UCI modulation symbols from the first symbol on PUSCH in the time slot and/or transmission occasion for mapping UCI according to the sequence of time from front to back; or mapping the UCI modulation symbol preferentially on the RE closest to the DMRS symbol.

In another aspect of the present invention, there is provided a method performed by a user equipment in the wireless communication system, comprising performing a second operation under the condition that a transport block over multi-slot physical uplink shared channel TBoMS PUSCH transmission is supported; transmitting the TBoMS PUSCH, wherein the second operation includes a rate matching RM operation and/or a bit interleaving operation.

In another aspect of the present invention, there is provided a method performed by a user equipment in the wireless communication system, wherein the rate matching RM operation comprises a continuous rate matching operation and/or a segmented rate matching operation, wherein the continuous rate matching operation includes: the starting position of rate matching output bits in the first time slot and/or transmission occasion is determined according to a given RV, and the starting position of rate matching output bits in the other slot(s) and/or transmission occasion is a position next to the ending position of rate matching output bits in the previous time slot and/or transmission occasion, and wherein the segmented rate matching operation includes: the starting position of rate matching output bits in each time slot and/or transmission occasion is acquired according to a given RV sequence.

In another aspect of the present invention, there is provided a method performed by a user equipment in the wireless communication system, wherein the continuous rate matching operation includes that the number of output bits after rate matching in one time slot and/or transmission occasion is determined by multiplying the number of REs available for transmitting data in the current time slot and/or transmission occasion by the modulation order of symbols.

In another aspect of the present invention, there is provided a method performed by a user equipment in the wireless communication system, wherein when a first condition is satisfied, a segmented rate matching operation is used, the first condition includes at least one of following: the number of time slots and/or transmission occasions occupied by the TBoMS PUSCH is less than a first value N1; the number of redundant versions RVs is less than the second value N2; the actual code rate of PUSCH transmission is less than the first threshold value; the ratio of the number of redundant RVs to the number of time slots and/or transmission occasions occupied by the TBoMS PUSCH is greater than the ratio of the actual code rate of PUSCH transmission to the code rate of PUSCH mother code.

In another aspect of the present invention, there is provided a method performed by a user equipment in the wireless communication system, in which, when a first condition is satisfied and it is determined to use the segmented rate matching operation, the user equipment enables a new RV design and/or a new RV sequence.

In another aspect of the present invention, there is provided a method performed by a user equipment in the wireless communication system, wherein the bit interleaving operation interleaves coded bits according to one of the following interleaving patterns, wherein the interleaving patterns include: the coded bits are coded bits after rate matching; the coded bits are coded bits on all time slots and/or transmission occasions occupied by TBoMS; the coded bits are coded bits on current time slots and/or transmission occasions from all time slots and/or transmission occasions occupied by TBoMS; and the interleaving pattern is preset or obtained by the system through network side configuration.

In another aspect of the present invention, there is provided a user equipment UE, which includes a transceiver and a controller configured to perform a first operation when a transport block over multi-slot physical uplink shared channel TBoMS PUSCH overlaps with a first uplink signal; and transmit the TBoMS PUSCH signal and/or the first uplink signal, wherein the first operation includes adjusting the transmission power for signal transmission of TBoMS PUSCH, increasing the priority of the TBoMS PUSCH, feeding back the information of power reduction to a base station and/or multiplexing uplink control information UCI carried by the first uplink signal on the TBoMS PUSCH for transmission.

In another aspect of the present invention, there is provided an electronic device comprising: a memory configured to store a computer program; and a processor configured to run the computer program to implement the method according to any one of the above embodiments. The disclosure also provides a computer-readable medium on which computer-executable instructions are stored, which, when executed, perform any of the methods described in the embodiments of the disclosure.

As used herein, "user equipment" or "UE" can refer to any terminal with wireless communication capability, including but not limited to mobile phones, cellular phones, smart phones or personal digital assistants (PDA), portable computers, image capturing devices such as digital cameras, game devices, music storage and playback devices, and any portable unit or terminal with wireless communication capability, or Internet facilities that allow wireless Internet access and browsing, etc.

As used herein, the term "base station" (BS) or "network equipment" can refer to eNB, eNodeB, NodeB, or base transceiver station (BTS) or gNB, etc., according to the used technology and terminology.

The "memory" here may be of any type suitable for the technical environment of this document, and can be implemented using any suitable data storage technology, including but not limited to semiconductor-based memory devices, magnetic memory devices and systems, optical memory devices and systems, fixed memory and mobile storage.

The processor here may be of any type suitable for the technical environment of this document, including but not limited to one or more of the following: general-purpose computers, special-purpose computers, microprocessors, digital signal processors DSPs, and processors based on a multi-core processor architecture.

The above description is only the preferred embodiment of the present invention, and it is not intended to limit the present invention. Any modification, equivalent replacement, improvement, etc. made within the spirit and principle of the present invention should be included in the scope of the present invention.

It can be understood by those skilled in the art that the present invention includes devices for performing one or more of the operations described in this application. These devices can be specially designed and manufactured for the required purposes, or they can also include known devices in general-purpose computers. These devices have stored therein computer programs that are selectively activated or reconfigured. Such a computer program can be stored in a device (e.g., computer) readable medium or in any type of medium suitable for storing electronic instructions and respectively coupled to a bus, including but not limited to any type of disk (including floppy disk, hard disk, optical disk, CD-ROM, and magneto-optical disk), ROM(Read-Only Memory), RAM(Random Access Memory), EPROM (erasable programmable read-only memory), EEPROM (electrically erasable programmable read-only memory), flash memory, magnetic card or optical card. That is, a readable medium includes any medium that stores or transmits information in a readable form by a device (e.g., a computer).

It can be understood by those skilled in the art that each block in these structural diagrams and/or block diagrams and/or flow diagrams and combinations of blocks in these structural diagrams and/or block diagrams and/or flow diagrams can be implemented by computer program instructions. Those skilled in the art can understand that these computer program instructions can be provided to a processor of a general-purpose computer, a professional computer or other programmable data processing methods for implementation, so that the scheme specified in the block or blocks of the structure diagram and/or block diagram and/or flow diagram disclosed by the present invention can be executed by the processor of the computer or other programmable data processing methods.

Those skilled in the art can understand that the steps, measures and schemes in various operations, methods and processes already discussed in the present invention can be alternated, changed, combined or deleted. Furthermore, other steps, measures and schemes in various operations, methods and processes already discussed in the present invention can also be alternated, changed, rearranged, decomposed, combined or deleted. Furthermore, the steps, measures and schemes in various operations, methods and processes disclosed in the prior art can also be alternated, changed, rearranged, decomposed, combined or deleted.

The above is only a partial embodiment of the present invention. It should be pointed out that for those skilled in the art, without departing from the principle of the present invention, several improvements and embellishments can be made, which should also be regarded as the protection scope of the present invention.

The invention claimed is:

1. A method performed by a terminal in a wireless communication system, the method comprising:

determining to perform a rate matching for a transport block over multi-slot physical uplink shared channel (TBoMS PUSCH) transmission;

identifying whether a slot is a first time slot within multiple slots associated with the TBoMS PUSCH transmission for the rate matching;

for the first time slot, determining a first starting position of bits for the rate matching based on a value of a redundancy version (RV); and for each time slot other than the first time slot, determining a second starting position of bits for the rate matching as a position next to an ending position of the rate matching output bits in a previous time slot.

2. The method of claim 1, further comprising:

transmitting, to a base station, data for TBoMS PUSCH transmission based on the rate matching.

3. The method of claim 1, wherein the rate matching is a continuous rate matching.

4. The method of claim 1, wherein the rate matching for the TBoMS PUSCH transmission is performed in case that the terminal supports the TBoMS PUSCH transmission.

5. A terminal in a wireless communication system, the terminal comprising:

a transceiver; and at least one processor configured to:

determine to perform a rate matching for a transport block over multi-slot physical uplink shared channel (TBoMS PUSCH) transmission, identify whether a slot is a first time slot within multiple slots associated with the TBoMS PUSCH transmission for the rate matching, for the first time slot, determine a first starting position of bits for the rate matching based on a value of a redundancy version (RV), and for each time slot other than the first time slot, determine a second starting position of bits for the rate matching as a position next to an ending position of the rate matching output bits in a previous time slot.

6. The terminal of claim 5, wherein the at least one processor is further configured to:

transmit, to a base station via the transceiver, data for TBoMS PUSCH transmission based on the rate matching.

7. The terminal of claim 5, wherein the rate matching is a continuous rate matching.

8. The terminal of claim 5, wherein the rate matching for the TBoMS PUSCH transmission is performed in case that the terminal supports the TBoMS PUSCH transmission.

* * * * *